United States Patent Office 2,832,789
Patented Apr. 29, 1958

2,832,789

SULFUR DYESTUFFS OF THE PHTHALOCYANINE SERIES

Werner Zerweck, Frankfurt am Main, and Heinrich Ritter and Eberhard Stier, Frankfurt am Main Fechenheim, Germany, assignors to Cassella Farbwerke Mainkur Aktiengesellschaft, Frankfurt am Main Fechenheim, Germany, a company of Germany No Drawing. Application December 19, 1956
Serial No. 629,239

Claims priority, application Germany July 2, 1953

8 Claims. (Cl. 260—314.5)

This invention relates to new sulfur dyestuffs of the phthalocyanine series and a process for producing the same and is a continuation-in-part of application Serial No. 440,533, filed June 30, 1954, and a continuation-in-part of application Serial No. 528,824, filed August 16, 1955.

It is known in the prior art that sulfur dyestuffs of the phthalocyanine series ranging from green to blue shades can be produced by reducing phthalocyanine sulfochlorides.

The dyestuffs of the present invention are generally mixtures of metal phthalocyanines containing several nitrogen-containing and sulfur-containing groups. The main components of these mixtures are dyestuffs of the formula:

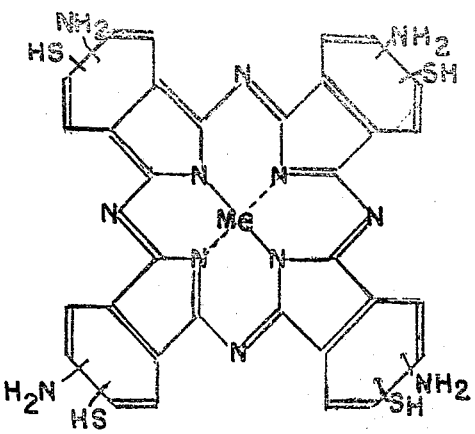

wherein Me is selected from the group consisting of nickel, copper, and cobalt. These sulfur dyestuffs are of a greenish-grey to bluish-grey shade, shades unknown in the phthalocyanine series prior to this invention. As in the case of other sulfur dyestuffs, the dyestuffs of the present invention are oxidized during dyeing to contain disulfide groups instead of the SH groups of the above formula.

In accordance with the process of the present invention, the new dyestuffs are formed by reacting a metal tetramino phthalocyanine (the metal being of the group consisting of nickel, copper, and cobalt), produced in situ or as an initial reactant, with chlorosulfonic acid at a temperature of between about 70° C. and 150° C. and then reducing the resulting product, preferably with iron or zinc, in a mineral acid medium.

More particularly, and in the event an aforesaid metal tetramino phthalocyanine is employed as an initial reactant, i. e., instead of forming the same in situ, it is treated with chlorosulfonic acid at a temperature within the aforesaid range, and subsequently reduced to produce the new and novel dyestuffs (see Examples 2–4.)

Introduction of mercapto-groups into the metal tetramino phthalocyanines may, however, also be effected by the action of sulfur chloride in the presence of chlorosulfonic acid as a solvent (see Example 5). Furthermore the two methods, i. e. the reaction with chlorosulfonic acid with subsequent reduction and the reaction with sulfur chloride, may be combined (see Example 6.)

The metal tetramino phthalocyanines are usually prepared by a reduction of the corresponding metal tetranitro phthalocyanines. The reduction may be combined with the introduction of the mercapto groups by treating the metal tetranitro phthalocyanines with sulfur and chlorosulfonic acid (see Example 1.)

However, and in the event it is desired to produce the metal tetraminophthalocyanine in situ, this may be done by simultaneous treatment of a metal phthalocyanine with hydroxylamine and chlorosulfonic acid under the same conditions of temperature and subsequently reducing the resulting reaction product by the use of a metal, such as iron or zinc in a mineral acid medium. In the case of the reaction with hydroxylamine and cholorsulfonic acid, it is preferred to employ a catalyst which is a compound of an element belonging to group Va or VIa of the periodic system. Preferred catalysts are ammonium molybdate or vanadium pentoxide. As illustrated in the Examples 7 to 12 hereinafter, variation in the concentration of hydroxylamine in the reaction mixture permits variation of the shades of the new dyestuffs from a sodium sulfide bath on cotton. This is a particularly advantageous feature of this embodiment of the process for producing dyestuffs in accordance with the present invention.

When producing dyestuffs by directly reacting with chlorosulfonic acid, a metal tetramino phthalocyanine which is prepared from 4-nitrophthalic acid and in which, therefore, the position of the amino groups is clear, particularly valuable compounds are obtained, the main component of which is represented by the formula:

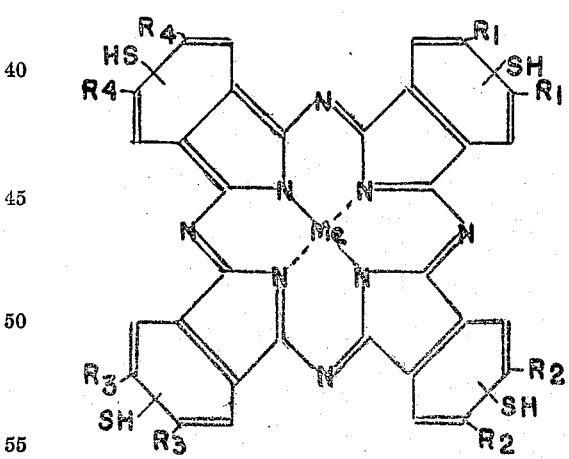

wherein one of each of $R_1$, $R_2$, $R_3$, and $R_4$ is $NH_2$ and the other of each of $R_1$, $R_2$, $R_3$, and $R_4$ is hydrogen and Me is selected from the group consisting of nickel, copper, and cobalt and the SH-groups replace one of the 3 H-atoms of each benzene nucleus.

As illustrated in the examples appearing hereinafter, wherein all parts are parts by weight and all temperatures are of the centigrade scale, the dyestuffs of the present invention possess good fastness properties, fastness to light being exceptional as compared wtih many other dyestuffs.

*Example 1*

15.1 parts of tetra-(4-nitro)-copper phthalocyanine are introduced into 227 parts of chlorosulfonic acid. After adding 12.8 parts of sulfur, the mixture is cautiously heated until an exothermic reaction begins, i. e. to 65–

70°. The temperature is then raised to 135° and the mass is stirred for 5 hours at 135°. The reaction mass is poured into water or upon ice and worked up in a known manner. The black powder thus obtained dyes cotton, from a bluish dark-green sodium sulfide solution, greenish olive-grey shades of a good fastness to washing and a very good fastness to light. If the reaction is performed at 90°, a product is obtained which delivers somewhat more bluish dyeings with the same fastness properties.

Upon replacing the tetra-(4-nitro)-copper phthalocyanine used in the above example by 15 parts of tetra-(4-nitro)-cobalt phthalocyanine a dyestuff with closely analogous properties is obtained.

*Example II*

12.7 parts of tetramino copper phthalocyanine (prepared in a known manner from a nitrating mixture of phthalic acid, containing 3- and 4-nitrophthalic acid) are stirred in a mixture of 190.5 parts of cholorosulfonic acid for 2 hours at 125°. The reaction mass is poured onto a mixture of 857 parts of ice, 200 parts of concentrated hydrochloric acid and 40 parts of iron powder and the temperature is raised within 24 hours, with stirring, to 85–90°. The dyestuff is then isolated in the usual manner. This black amorphous product dissolves in concentrated sulfuric acid with a dull dark-green color and dyes cotton, from a dull and bluish green sodium sulfide solution, greenish-grey shades of a good resistance to washing and an outstanding fastness to light.

*Example III*

12.6 parts of tetramino nickel phthalocyanine (prepared in a known manner from a nitrating mixture of phthalic acid, containing 3- and 4-nitrophthalic acid) are stirred in a mixture of 190.5 parts of chlorosulfonic acid for 2 hours at 125°, the subsequent treatment being as indicated in Example II. The product thus obtained dissolves in concentrated sulfuric acid with a bluish dark-green color and dyes cotton, from a dull and bluish green sodium sulfide solution, greenish-grey shades of a good resistance to washing and a very good fastness to light.

A similar product is obtained by starting from tetramino cobalt phthalocyanine and employing the same conditions.

*Example IV*

25.4 parts of tetra-4-amino copper phthalocyanine (prepared from 4-nitrophthalimide in a known manner) are stirred in 381 parts of chlorosulfonic acid for 2 hours at 135°. The reaction mass is poured onto a mixture of 935 parts of ice, 762 parts of water, 800 parts of concentrated hydrochloric acid and 80 parts of iron powder, the temperature is raised within 24 hours to 85–90° and the dyestuff is isolated in the usual manner. The black amorphous product dissolves in concentrated sulfuric acid with a dull dark-green color. It dyes cotton, from a bluish dark-green sodium sulfide solution, greenish olive-grey shades of a good resistance to washing and an outstanding fastness to light.

*Example V*

12.7 parts of tetra-(4-amino)-copper phthalocyanine are introduced into a mixture of 191 parts of chlorosulfonic acid and 54 parts of sulfur chloride ($S_2Cl_2$). Upon heating to about 90–100°, the reaction starts with the liberation of hydrogen chloride. During about 50–60 minutes the mass is heated to 135° and is then stirred for 2 hours at this temperature. The reaction mixture is then poured into water or upon ice and the product is isolated in a known manner. A black powder is obtained which dyes cotton, from a sodium sulfide solution, greenish olive-grey shades of a good fastness to washing and a very good fastness to light.

Upon replacing the tetra-(4-amino)-copper-phthalocyanine used in this example by an equal amount of tetra-(3+4)-amino-copper phthalocyanine (prepared in a known manner from a mixture of 3- and 4-nitrophthalic acid obtained by nitrating phthalic acid anhydride), a product is formed which dyes cotton, from a bluish black-grey sodium sulfide solution, considerably more bluish olive grey shades with the same overall properties as those of the aforesaid product.

If instead of the tetra-(4-amino)-copper phthalocyanine employed in this example, 12.6 parts of tetra-(4-amino)-cobalt phthalocyanine are used and the mass is stirred for 2 hours at 90° instead of at 135°, a product is obtained which as to its shade is very close to the copper dyestuff.

*Example VI*

12.7 parts of tetra-4-amino-copper phthalocyanine are stirred in 191 parts of chlorosulfonic acid for 1 hour at 135°. Subsequently, at an equal temperature and within 10–20 minutes, 27 parts of sulfur chloride are added by dropping in with stirring for another hour at 135°. For the purpose of a reduction, the reaction mixture is poured onto a mixture of 381 parts of ice, 400 parts of crude concentrated hydrochloric acid and 26.8 parts of iron powder. After stirring for several hours at about 50°, the dyestuff is isolated in a usual manner. It dyes cotton, from a dirty black-grey sodium sulfide solution, greenish olive-grey shades of a good fastness to washing and a very good fastness to light. In comparison to the products mentioned in the preceding examples, it is distinguished by an especially great strength of color.

Upon replacing the tetra-(4-amino)-copper phthalocyanine used in this example by an equal amount of tetra-(3+4)-amino-copper phthalocyanine (prepared in a known manner from a mixture of 3- and 4-nitrophthalic acid obtained by nitrating phthalic acid anhydride), a dyestuff is obtained which dyes cotton, from a bluish black-grey sodium sulfide solution, a considerably bluer shade. The product possesses analogous fastness properties as the other dyestuff of this example.

*Example VII*

23 parts of copper phthalocyanine, 15.6 parts of 95% hydroxylamine sulfate and 0.11 part of ammonium molybdate are stirred in 345 parts of chlorosulfonic acid for 2 hours at 125°. At the same temperature, there are added by drops within 10–20 minutes 54 parts of sulfur chloride and the mass is stirred again for 1–2 hours at 125°. The reaction mixture is poured onto a mixture of 690 parts of ice, 500 parts of crude concentrated hydrochloric acid and 54 parts of iron powder. After stirring the mass for several hours at about 50°, the dyestuff is obtained. The product dyes cotton, from a violet-tinged black-grey sodium sulfide solution, greenish olive-grey shades. The dyeings possess a good fastness to washing and a very good fastness to light.

If the amount of the sulfur chloride is diminished to 40.5 or 27 parts, dyestuffs of almost equal properties are obtained. If the amount of the hydroxylamine sulfate is increased from 15.6 to 17.5 parts, a product is formed which is distinguished from that mentioned above only in a very small degree.

*Example VIII*

23 parts of copper phthalocyanine and 0.23 part of ammonium molybdate are introduced into 460 parts of chlorosulfonic acid. After adding 26 parts of hydroxylamine sulfate, the mixture is heated gradually to 150° and stirred for 2 hours at this temperature. The reaction mass is then poured onto a rapidly stirred mixture of 1380 parts of ice and 80 parts of iron powder. After stirring for 24 hours at 50°, the black-green dyestuff is filtered by suction and freed of iron salts and acids by washing it. The product dyes cotton, from a sodium sulfide bath, greenish grey shades of good fastness properties.

The same product is obtained when ammonium molybdate is replaced by vanadium pentoxide or when iron powder is replaced by zinc powder.

*Example IX*

23 parts of copper phthalocyanine and 0.2 part of ammonium molybdate are introduced into 342 parts of chlorosulfonic acid. After adding 26 parts of hydroxylamine sulfate, the temperature of the mixture is raised to 135°, a subsequent stirring being performed for 2 hours at this temperature. The reaction mass is poured onto a mixture of 1030 parts of ice and 80 parts of iron powder and the mass is heated without delay to 90°–95°. After stirring during 3 hours at the said temperature, the dyestuff thus formed is worked up as set forth in Example VIII. The shade of this product is somewhat more greenish than that of the dyestuff obtained according to Example VIII.

If the hydroxylamine sulfate used in this Example is replaced by 22 parts of hydroxylamine hydrochloride, the same dyestuff is obtained.

*Example X*

22.8 parts of cobalt phthalocyanine and 0.2 part of ammonium molybdate are introduced into 342 parts of chlorosulfonic acid. After adding 19.7 parts of hydroxylamine sulfate, the mixture is stirred for 2 hours at 130°. The reaction mass is subjected to reduction as described in Example IX and worked up. A dyestuff is obtained which is absorbed from a sodium sulfide solution by cotton, yielding a bluish grey shade.

If the amount of chlorosulfonic acid used in the above example is lessened to 225 parts, the same dyestuff is obtained.

*Example XI*

22.8 parts of cobalt phthalocyanine and 0.2 part of ammonium molybdate are introduced into 342 parts of chlorosulfonic acid. After adding 22 parts of hydroxylamine hydrochloride, the mixture is stirred for 2 hours at 125°. The reaction mass is poured onto a mixture of 1030 parts of ice and 80 parts of iron powder. The mass is then stirred for 30 minutes at 20°, 2 hours at 50°–55°, and 1 hour at 95°. After working up as described in the previous examples, the product obtained dyes cotton from a sodium sulfide solution to bluish grey shades.

If using instead of the 22 parts of hydroxylamine hydrichloride indicated in the abov example only 16.6 parts thereof, a very similar product is obtained.

*Example XII*

22.8 parts of nickel phthalocyanine and 0.2 part of ammonium molybdate are introduced into 342 parts of chlorosulfonic acid. After adding 19.7 parts of hydroxylamine sulfate, the mixture is stirred for 2 hours at 125°. The mass is poured onto a mixture of 1380 parts of ice, 80 parts of iron powder and 300 parts of concentrated hydrochloric acid and is stirred, while raising the temperature of 80°–90°, until the reaction is complete. The product worked up in the same way as in the preceding examples has very similar properties to substances described in the Examples VIII and IX.

The foregoing description of the present invention is for the purpose of illustration only and is not limiting to the scope thereof which is set forth in the claims.

We claim:

1. A process for forming a dyestuff which comprises reacting a metal tetramino phthalocyanine, wherein the metal is a member of the group consisting of nickel, copper and cobalt, with chlorosulfonic acid at a temperature of between about 70° C. and 150° C. and, thereafter, reducing the reaction product with a metal of the group consisting of iron and zinc in a mineral acid medium.

2. A process for forming a dyestuff which comprises reacting copper tetra-(4)-amino-phthalocyanine with chlorosulfonic acid at a temperature of between 70° C. and 150° C. and, thereafter, reducing the reaction product with iron in a mineral acid medium.

3. The process of claim 1, wherein the metal tetramino phthalocyanine is produced in situ by reacting the corresponding metal phthalocyanine with hydroxylamine in the presence of a compound of the group consisting of ammonium molybdate and vanadium pentoxide.

4. The process of claim 3 wherein the corresponding metal phthalocyanine is nickel phthalocyanine.

5. The compound of the formula:

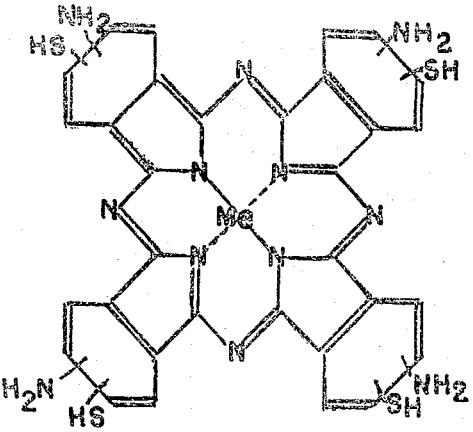

wherein Me is selected from the group consisting of nickel, copper and cobalt.

6. The compound of claim 5 wherein Me is nickel.

7. The compound of the formula:

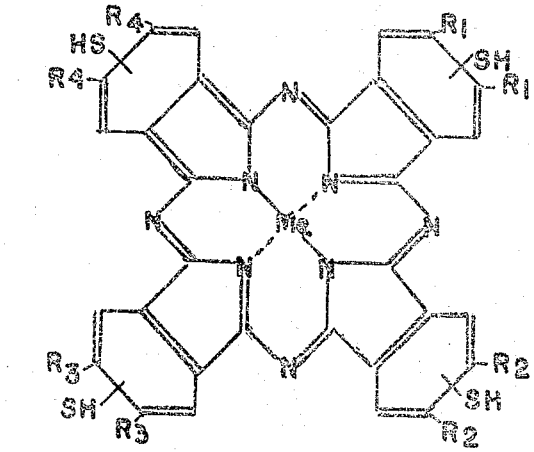

wherein one of each of $R_1$, $R_2$, $R_3$, and $R_4$ is $NH_2$ and the other of each of $R_1$, $R_2$, $R_3$, and $R_4$ is hydrogen and Me is selected from the group consisting of nickel, copper, and cobalt and the SH-groups replace one of the 3 H-atoms of each benzene nucleus.

8. The compound of claim 7 wherein Me is copper.

References Cited in the file of this patent

UNITED STATES PATENTS

| | | |
|---|---|---|
| 2,219,330 | Nadler et al. | Oct. 29, 1940 |
| 2,266,404 | Bienert et al. | Dec. 16, 1941 |
| 2,280,072 | Haddock | Apr. 21, 1942 |
| 2,484,300 | Mayhew | Oct. 11, 1949 |
| 2,613,128 | Baumann | Oct. 7, 1952 |